July 6, 1926.
S. E. VAN DUYNE
1,591,250
VEHICLE REVERSE CONTROL
Filed July 2, 1925    2 Sheets-Sheet 1
*Fig.1,*
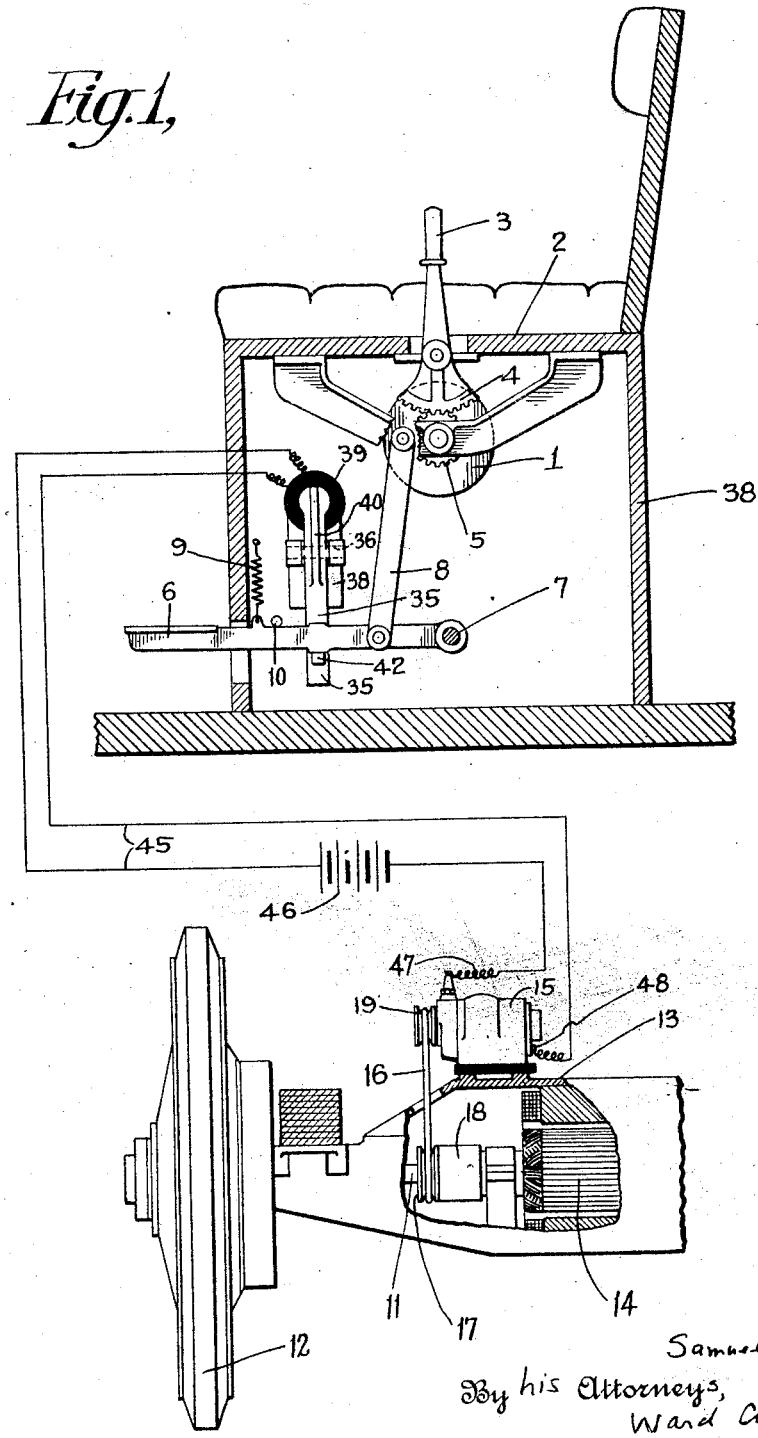
Inventor
Samuel E. VanDuyne,
By his Attorneys,
Ward Crosby and Smith July 6, 1926.
S. E. VAN DUYNE
1,591,250
VEHICLE REVERSE CONTROL
Filed July 2, 1925    2 Sheets-Sheet 2
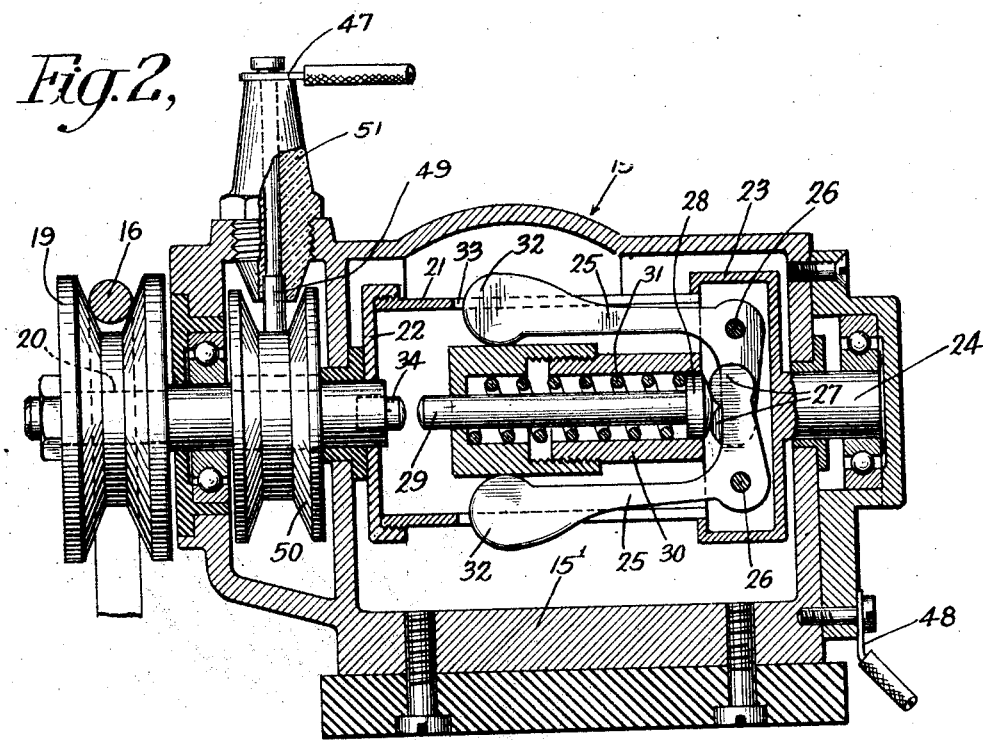
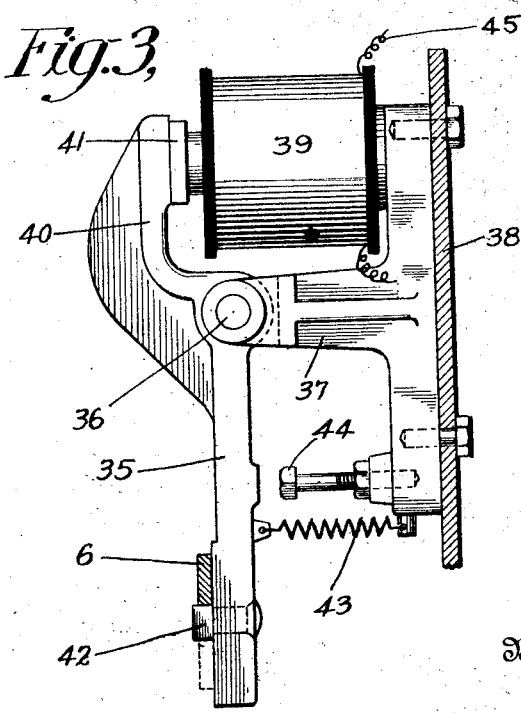
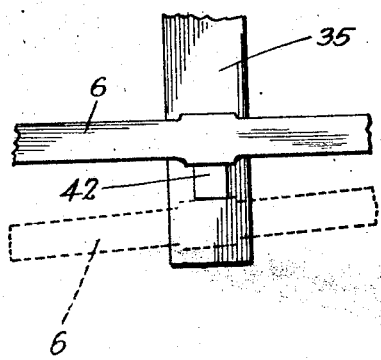
Inventor
Samuel E. Van Duyne,
By his Attorneys,
Ward, Crosby and Smith Patented July 6, 1926.

1,591,250

UNITED STATES PATENT OFFICE.

SAMUEL E. VAN DUYNE, OF VENTNOR CITY, NEW JERSEY.

VEHICLE REVERSE CONTROL.

Application filed July 2, 1925. Serial No. 41,045.

The invention relates to improvements in vehicle reverse control and more particularly to devices whereby actuation of the reverse mechanism, while the vehicle is in motion, will be prevented. The invention relates more particularly to the use of such devices in electric vehicles and particularly in electric trucks or other relatively heavy electrically driven vehicles.

The drivers of electric trucks quite commonly make use of the reverse lever as a means for braking the vehicles. This is a bad practice for various reasons against which the truck manufacturers issue warnings. It may be stated, briefly, that reversing the direction of the motor for the purpose of stopping the vehicle is apt to cause damage by burning the controller fingers and segments, which sometimes occurs to such an extent as to weld the contacts together, locking the car with the current on, which may cause a complete burning out of the armature and fields of the motor, and cause accidents. The practice referred to is also apt to burn out the motor fields even though the controller fingers and segments do not become welded together, because the use of the reverse lever referred to causes high voltage to be thrown into the field windings.

The reversing of the rear wheels of the vehicle while the car is in forward motion, also results in a large strain on the entire vehicle, particularly on the differential, rear axles, and internal gears of the driving mechanism which causes excessive wear and is apt to cause breakage.

The use of the reverse referred to likewise causes heavy vibration which is detrimental to the storage battery. Attempts have been made to reduce the objectionable practice referred to, by locking the reverse while the controller is in any of its forward positions, which makes it necessary for the driver to bring the controller to neutral position before using the reverse. This, however, is not sufficient to prevent the damage referred to being done, since it is possible for the driver of an electric truck to bring his controller back to neutral, to then apply the reverse and immediately thereafter advance the controller which causes reverse rotation of the motor. This being done quickly by the driver, the vehicle is still in forward motion when the reverse is applied, which is likely to cause damage in the various manners referred to above.

In accordance with the preferred form of the present invention means are provided such that the reverse cannot be used by the driver until the vehicle has come to a complete stop. Likewise, when the vehicle is in reverse motion, the motor cannot again be reversed to apply forward movement to the vehicle until the latter has been brought to a complete stop. By this means the vehicle is completely protected so far as misuse of the same by improper use of the reverse and forward controller mechanisms by the driver is concerned.

I prevent the operation of the reversing devices by the employment of a device which is actuated to lock the reverse lever so long as the vehicle is in motion. This is preferably accomplished by the use of a device in the nature of a centrifugal governor whereby a member may be moved by the rotation of the governor weights, this movement being utilized to operate a latching or locking mechanism for the reverse lever. The governor mechanism may be rotated by a connection with a rotating element of the vehicle such as the drive shaft, the latching device thus being projected beneath the reverse lever of the vehicle to prevent operative movement of the reverse lever so long as the car is in forward motion. Likewise, the vehicle being in reverse movement with the reverse lever depressed, the same latching device is preferably projected above the reverse lever to prevent the upward movement of the latter, so that the motor cannot be reversed back into its forward direction of rotation until the vehicle has been brought to a stop.

Objects of the invention comprise the provision of improved mechanisms and combination of parts effective for securing the results referred to above as will appear more fully in the following specification and be particularly pointed out in the appended claims.

In order that the invention may be more clearly understood attention is hereby directed to the accompanying drawings forming part of this application and illustrating one embodiment of the invention which I at present prefer.

In the drawings, Figure 1 is a partial vertical section taken through the control apparatus and also through the rear axle of an electric truck, showing the improved construction, certain parts being shown in side elevation;

Fig. 2 is an enlarged vertical section through the governor device for controlling the reverse lever latch;

Fig. 3 is an enlarged partial side elevation of the reverse latch lever and co-acting parts; and Fig. 4 is an enlarged partial side elevation of the reverse lever and the latch mechanism therefor, the reverse lever being shown in full lines in raised position and in dotted lines in lowered position.

Referring to the drawings, controller 1 is indicated as mounted beneath the driver's seat 2. Controller handle 3 serves to rotate the controller by means of the segment 4 and pinion 5 as is usual. The reverse lever 6 is pivoted at 7 and is connected by a link 8 to a portion of the controller in the well known manner. A spring 9 is illustrated for normally holding the reverse lever up against a stop 10. Depression of the reverse lever 6 results in reversing the motor by causing relative rotation between the brushes and the commutator segments of the motor on which they bear in the well known manner; while the speed of the vehicle is controlled by operation of the handle 3, forward speeds being imparted by the operation of controller handle 3 from its neutral position when reverse lever 6 is up, and corresponding reverse speeds being given by the similar movement of the controller handle when the reverse lever is down.

A rear drive shaft of the vehicle is indicated at 11 in the lower part of Figure 1, one of the rear traction wheels 12 being indicated as being driven thereby. The rear axle housing is indicated at 13 within which is mounted the motor, the armature of which is shown at 14.

The governor switch or centrifugal device for operating the reverse lever locking devices may be mounted as is indicated at 15 in Figure 1, on the rear axle housing 13. This governor device, as is indicated in Figs. 1 and 2, is shown as rotated by a belt 16 which runs over a pulley 17 on drive shaft 11, adjacent to the differential indicated at 18, this belt also running over a pulley 19 which is secured on a shaft 20 of the governor device. The governor centrifugal device referred to may be of a usual form used for centrifugal speed governors. A hollow cylindrical member 21 is provided with an end portion 22 which is secured to the rotating shaft 20. The cylindrical member 21 is shown as provided at its opposite end with an enlargement 23 at the end of which is a short stub shaft 24 rotatably supported in alignment with shaft 20. The casing 15' of the device is provided with suitable bearings for shaft 20 and the stub shaft 24 in the usual manner.

The governor arms 25, 25 are pivoted on pins 26, 26 within the enlarged portion 23 of the rotating cylindrical member 21, arms 25, 25 having toes or extensions 27, 27 which bear against the enlarged end 28 of a horizontally movable pin 29. Pin 29 is slidably mounted within a cylindrical housing 30 integral with or secured to the extension 23 of the cylindrical member 21. Pin 29 is spring pressed to the right, referring to Fig. 2, by the spiral spring 31, one end of which bears against the head 28 of pin 29 while the other end of the spring bears against a suitable abutment at the end of the housing 30 through which pin 29 extends. The head 28 of pin 29 bearing against the extensions 27 of lever 25 tends to hold the weighted end portions 32, 32 of arms 25, 25 in their innermost positions. Rotation of the governor device, which ensues whenever drive shaft 11 of the vehicle is in motion, serves to cause ends 32 of arms 25, 25 to move outwardly through openings 33 in cylindrical member 21, so as to move the pin 29 to the left, Fig. 2, in the well known manner.

An electrical contact member 34 is carried by the end of rotating shaft 20 and is caused to complete an electric circuit when pin 29 and contact 34 are brought into engagement with each other during the rotation of drive shaft 11, this engagement being caused by the outward movement of weighted arms 25, 25 of the governor device as stated. The completion of the electric circuit referred to causes operation of the device for preventing movement of the reverse lever 6 as will now be described.

In the form of device illustrated a latch lever 35 is pivotally mounted at 36 to a bracket 37 which extends outwardly from the vertical framing 38 beneath the driver's seat 2. An electromagnet 39 is mounted above pivot 36 of lever 35 beneath the driver's seat. Lever 35 has an upward extension 40 carrying an armature 41 which is attracted by electromagnet 39 when the latter is energized. Lever 35 is provided adjacent its lower end with a forwardly extending lug 42 which may be integral therewith or secured thereto, the latter being shown in the drawings.

When the electromagnet is energized, lug 42 will be swung directly under the reverse lever 6 when the latter is in its raised position, as is shown in Figs. 1 and 3, thus preventing downward movement of the reverse lever, which would reverse the polarity of the motor if permitted. The same position of the lug 42 and of the reversing foot-lever 6 is also shown in full lines in Fig. 4. Whenever the reverse lever 6 has been depressed, into the position indicated in dotted lines in Fig. 4 so that the vehicle is moving rearwardly, the energizing of electromagnet 39 serves to move lug 42 forwardly as before, in which case lug 42 is projected and held immediately above reverse lever 6 as is indicated in Fig. 4, so that in this case lever 6 cannot be raised into the position necessary to enable the vehicle to move forwardly. A spring 43 is indicated in Fig. 3 as secured to latch lever 35 and bracket 37, this spring withdrawing lug 42 from locking position with respect to reverse lever 6 whenever electromagnet 39 is de-energized. A stop 44 may be provided against which latch lever 35 will bear when this lever is withdrawn into its inoperative position by spring 43.

An electric circuit is indicated in Fig. 1 as comprising conductors 45, 45 in circuit with a source of current indicated as the battery 46. Conductors 45 are connected to the terminals of electromagnet 39, and also to the terminals 47 and 48 which are connected respectively with the contact 34 and the pin 29 of the governor device, the end of pin 29 constituting the contact which co-operates with contact 34 to close the circuit as stated. Current may be led from terminal 47 to contact 34 in any suitable manner as by means of the contact 49, which is electrically connected with terminal 47 and which bears against a wheel 50 secured to shaft 20. Terminal 48 is electrically connected with pin 29 in any suitable manner, as through the casing of the device to stub shaft 24 and through pins 26 and the toe portions 27 of the governor device to the end 28 of the pin 29. Proper insulating members should, of course, be provided to prevent the formation of a short circuit connection between terminals 47 and 48. Thus the electrical conductor extending from terminal 47 to spring contact 49 may extend through an insulating bushing 51 which prevents electrical connection beween terminal 47 and the casing 15' of the governor device and wheel 50 and shaft 20 mounted on the same, may similarly be insulated from casing 15' by suitable insulating bushing means.

The stiffness of the spring 31 of the governor device may be adjusted so that the weighted arms 25 will move outwardly, to complete the circuit 45, at contacts 34 and 29, upon a very slight rotational movement of the shaft from which the governor is operated. It is evident that the device may be made to operate upon a very slight rotational speed of the traction wheels 12, particularly where wheels 12 are driven by a gear train, with a reduction gearing from the drive shaft or shafts.

It will, therefore, be evident that when the vehicle is in forward motion, operation of reverse lever 6 is positively prevented by lug 42 and that the vehicle cannot be brought to a stop by operation of the reverse lever. When the vehicle is to be reversed, it must first be brought to a stop whereupon electromagnet 39 will be de-energized by the breaking of circuit 45 at the contact points 34 and 29, whereupon the reverse lever may be depressed and controller handle 3 again thrown forwardly to put the vehicle into reverse speed. As soon as the vehicle starts moving rearwardly the locking device described will again be put into operation with lug 42 extending above the reverse lever as shown in Fig. 4, so that the rearward movement of the vehicle can only be stopped by returning the controller handle to neutral position and applying the brake. When the vehicle has thus been brought to a stop the reverse lever 6 can be permitted to rise into its upper position so that the vehicle can again be started forwardly by the operation of controller handle 3 in the usual manner; but while the vehicle is moving rearwardly, the reverse lever 6 cannot be caused to move upwardly, to reverse the polarity of the motor, to permit the forward movement of the controller handle to cause the motor to act as a brake against the rearward movement of the vehicle. Accordingly, the objectionable practices of the drivers referred to are completely prevented.

It should be understood that the invention is not limited strictly to the details of construction which have been particularly described, but that various modifications of the same are included within the scope of the invention as is indicated by the form of the accompanying claims.

I claim:

1. In vehicle reverse control apparatus, the combination of means for driving the vehicle, a centrifugal governor device, means for rotating said device while the vehicle is in motion, means for reversing the direction of drive, comprising a driver-actuated member, and means, operated by said governor device, for locking said driver-actuated member.

2. In vehicle reverse control apparatus, the combination of an electric motor, means for driving the vehicle therefrom, means for reversing the motor, including a movable member adapted to be actuated by the driver, means for latching said movable member against operation, the vehicle having a shaft which rotates whenever the vehicle is in motion, and means actuated by the rotation of said shaft for operating said latching means.

3. In vehicle reverse control apparatus, the combination of an electric motor, means for driving the vehicle therefrom, means for reversing the motor, including a foot operated lever, having a lower position when the vehicle is to be backed and an upper position when the vehicle is to go forward, a latch member adapted to move to locking position under said lever when the latter is up and over said lever when the latter is down, and means for operating said latch member while the vehicle is in motion.

4. In vehicle reverse control apparatus, the combination of a drive shaft, a motor for rotating the same, means for reversing the direction of drive, comprising a movable member, a latching lever, movable to position to prevent operation of said movable member, a centrifugal governor device, means for rotating the same from said drive shaft, electromagnetic means for actuating said latching lever, and a circuit for energizing said electromagnetic means closed by operation of said governor device.

In testimony whereof I have signed my name to this specification.

SAMUEL E. VAN DUYNE.